United States Patent
Elting et al.

(10) Patent No.: US 9,404,539 B2
(45) Date of Patent: Aug. 2, 2016

(54) GUIDE CARRIAGE HAVING A ROLLING-BODY GUIDE PART MADE FROM AN ELASTOMER

(71) Applicant: Robert Bosch GmbH, Stuttgart (DE)

(72) Inventors: Martina Elting, Schweinfurt (DE); Matthias Zeier, Oberleichtersbach (DE); Gerhard Roesch, Bergrheinfeld (DE); Stefan Dorn, Arnstein (DE); Juergen Schenk, Knetzgau (DE); Sebastian Schierling, Knetzgau-Oberschwappach (DE); Michael Korbacher, Wipfeld (DE); Gerd Spatschek, Mellrichstadt (DE); Wolfgang Kuellstaedt, Grafenrheinfeld (DE); Richard Kuehnlein, Graefendorf (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/723,845

(22) Filed: May 28, 2015

(65) Prior Publication Data
US 2015/0345561 A1 Dec. 3, 2015

(30) Foreign Application Priority Data

May 28, 2014 (DE) .......................... 10 2014 210 180

(51) Int. Cl.
*F16C 29/06* (2006.01)
*F16C 33/76* (2006.01)
*F16C 29/08* (2006.01)

(52) U.S. Cl.
CPC .............. *F16C 33/76* (2013.01); *F16C 29/06* (2013.01); *F16C 29/0609* (2013.01); *F16C 29/0645* (2013.01); *F16C 29/088* (2013.01)

(58) Field of Classification Search
CPC ............. F16C 29/0602; F16C 29/0604; F16C 29/0607; F16C 29/0633; F16C 29/0635
See application file for complete search history.

(56) References Cited

U.S. PATENT DOCUMENTS

| 6,080,351 A * | 6/2000 | Shirai ................. F16C 29/0602 164/137 |
| 6,305,846 B1 | 10/2001 | Michioka et al. |
| 7,204,036 B2 | 4/2007 | Kato et al. |
| 2001/0016088 A1 * | 8/2001 | Teramachi .......... F16C 29/0602 384/44 |
| 2008/0292227 A1 * | 11/2008 | Chen ................... F16C 29/0602 384/45 |

FOREIGN PATENT DOCUMENTS

| DE | 90 11 444.2 U1 | 12/1990 |
| DE | 42 23 499 A1 | 1/1994 |

(Continued)

OTHER PUBLICATIONS

DE Search Report corresponding to DE 10 2014 210 180.8, dated Mar. 18, 2015 (German language document) (10 pages).

*Primary Examiner* — Thomas R. Hannon
(74) *Attorney, Agent, or Firm* — Maginot, Moore & Beck LLP

(57) ABSTRACT

A guide carriage is configured for use with an guide rail. The guide carriage has at least one row of rolling bodies received in a circulatory channel. The circulatory channel has a load-bearing section and a return channel connected together at their ends by a deflection channel. The load-bearing section is delimited by a carriage raceway on the guide carriage and a rail raceway on the guide rail. At least one sealing lip is arranged in sealing engagement with the guide rail when the guide carriage is mounted on the guide rail. At least one separate rolling-body guide part, composed in one piece of an elastomer, has two deflection sections, between which at least one guide section, extending longitudinally, is arranged. An associated sealing lip is arranged on the guide section. At least one radially inner deflection surface of a deflection channel is arranged on each deflection section.

13 Claims, 6 Drawing Sheets

(56) References Cited

FOREIGN PATENT DOCUMENTS

| DE | 43 11 515 A1 | 10/1994 |
| DE | 10 2006 027 061 B4 | 12/2007 |
| DE | 10 2007 056 862 A1 | 5/2009 |
| DE | 10 2011 083 526 A1 | 11/2012 |
| JP | 9-303390 A | 11/1997 |
| JP | 2008-57755 A | 3/2008 |
| JP | 2013-79717 A | 5/2013 |

* cited by examiner

GUIDE CARRIAGE HAVING A ROLLING-BODY GUIDE PART MADE FROM AN ELASTOMER

This application claims priority under 35 U.S.C. §119 to patent application number DE 10 2014 210 180.8, filed on May 28, 2014 in Germany, the disclosure of which is incorporated herein by reference in its entirety.

BACKGROUND

The disclosure relates to a guide carriage in accordance with the following description.

DE 10 2007 056 862 A1 has disclosed a guide carriage which is provided for use with an elongate guide rail. The guide carriage comprises four rows of roller-shaped rolling bodies which are received in each case in an associated endless circulatory channel, it being possible for the present disclosure to also be used for spherical rolling bodies. Each circulatory channel comprises a load-bearing section and a return channel which are connected to one another at both ends which lie opposite one another via in each case one curved deflection channel. The load-bearing section is delimited by a carriage raceway on the guide carriage and a rail raceway on the guide rail which extend in each case in a longitudinal direction. All the deflection channels are arranged within two separate end caps which are fastened to the two longitudinal end faces of the main body of the guide carriage which lie opposite one another.

Furthermore, a total of four longitudinal seals are provided which extend in the longitudinal direction and are composed of an elastomer. The two lower longitudinal seals are configured in each case as separate components. They are provided in each case on their two ends which lie opposite one another with a thickened portion, via which they are hooked into the two end caps, with the result that they are set under tensile stress.

According to a further embodiment of DE 10 2007 056 862 A1, the longitudinal seals are configured in one piece with a holding projection which holds the rolling bodies in the guide carriage when the latter is not situated on the guide rail. The corresponding component is configured from a hard plastic such as polyamide. The longitudinal seal therefore has a less satisfactory sealing action than the above longitudinal seal composed of an elastomer.

Moreover, U.S. Pat. No. 6,305,846 B1 has disclosed a guide carriage with four rows of spherical rolling bodies. The guide carriage has a single rolling-body guide part with two deflection sections, between which a total of eight guide sections are provided which extend in the longitudinal direction. The rolling-body guide part is composed of a hard plastic and does not have any longitudinal sealing lips.

SUMMARY

The advantage of the present disclosure lies in the fact that the guide carriage has a very small number of components and can therefore be produced inexpensively. Furthermore, the longitudinal sealing lip has a satisfactory sealing action.

It is proposed according to the following description that at least one separate rolling-body guide part is provided which is composed in one piece of an elastomer, the rolling-body guide part having two deflection sections, between which at least one guide section which extends in the longitudinal direction is arranged, an associated longitudinal sealing lip being arranged at least in sections on the guide section, in each case at least one radially inner deflection surface of a deflection channel being arranged on the two deflection sections. The longitudinal seal has a satisfactory sealing action, since it is composed of an elastomer. Here, an elastomer is preferably to be understood to mean an elastically deformable plastic, the glass transition point of which lies below ambient temperature. The sealing frame is most preferably composed of thermoplastic ether ester elastomer (TEEE, commercial name "Hytrel"). The addressed radial direction is defined by the curvature of the curved deflection channel. The guide sections preferably have a constant cross-sectional shape over their entire length.

Advantageous developments and improvements of the disclosure are specified in the following description.

It is preferred that two end caps are provided, on which at least one radially outer deflection surface of a deflection channel is arranged, the two deflection sections of the at least one rolling-body guide part being received in each case in an associated end cap. The end caps preferably bear against an associated second longitudinal end face of a main body.

It is preferred that the longitudinal sealing lip on the at least one guide section is continued in alignment on at least one end cap. The guide section extends only over the length of the main body. A region which cannot be covered by the longitudinal seal on the guide sections therefore remains in the region of the end caps. This problem is avoided by the above solution, in which a part of the longitudinal sealing lip is provided on the end cap. The longitudinal sealing lip is preferably continued in alignment on both end caps.

It is preferred that a holding projection is arranged parallel to the longitudinal sealing lip on the at least one guide section, the holding projection being configured to hold the associated rolling bodies in the guide carriage when the latter is not situated on the guide rail. As a result, the addressed rolling-body securing can be realized, without additional components being required.

It is preferred that the at least one rolling-body guide part has precisely two guide sections, the two deflection sections in each case having two radially inner deflection surfaces which are arranged between the two guide sections. The said rolling-body guide part can be mounted particularly simply on the main body of the guide carriage. The guide carriage preferably has a total of four rows of rolling bodies, the said guide carriage having two identical rolling-body guide parts for in each case two rows of rolling bodies.

It is preferred that a separate main body made from metal is provided, the carriage raceway being arranged on a separate raceway insert, the raceway insert having two first longitudinal end faces which lie opposite one another and bear against an associated deflection section of the at least one rolling-body guide part. The raceway inserts can rest loosely directly on the main body, the said raceway inserts being pressed against the main body solely by way of the prestressing force of the rolling bodies. However, it is also conceivable to fasten the raceway inserts to the main body in an integrally joined manner, in particular to adhesively bond it. Disruption-free and low-noise running of the rolling bodies in the guide carriage is achieved by way of the proposed contact of the first longitudinal end faces with the associated deflection section. The first longitudinal end faces are preferably of planar configuration, the said first longitudinal end faces being oriented perpendicularly with respect to the longitudinal direction. The addressed metal is preferably non-hardened steel. The return channel is preferably arranged directly in the main body, the rolling bodies being balls. The raceway insert is preferably composed of hardened steel.

It is preferred that the main body has two second longitudinal end faces which lie opposite one another, the raceway inserts protruding with at least one first longitudinal end face in the longitudinal direction beyond an associated second longitudinal end face of the main body. The load-bearing capability and the rigidity of the guide carriage are determined primarily by the length of the carriage raceway. The latter can be of particularly large configuration with the proposed features in the case of predefined external dimensions of the guide carriage. The second longitudinal end faces are preferably of planar configuration, the said second longitudinal end faces being oriented perpendicularly with respect to the longitudinal direction. All the first longitudinal end faces preferably protrude beyond the associated second longitudinal end faces.

It is preferred that the deflection sections bear in each case with a bearing face against an associated second longitudinal end face, the raceway insert engaging into an adapted recess of the deflection section. The raceway insert preferably bears loosely against the main body, the said raceway insert being held on the main body by the rolling-body guide part during the mounting of the guide carriage. The bearing face is preferably of planar configuration, the said bearing face being oriented perpendicularly with respect to the longitudinal direction.

It is preferred that the raceway insert is received with prestress between the deflection sections of the associated rolling-body guide part. As a result, the guide sections made from elastomer are set under tensile stress. This ensures that the comparatively elastic guide sections retain their shape when external forces act on them. This is the case, in particular, if the holding projections on the guide sections are to prevent the rolling bodies from falling out of the guide carriage. Furthermore, the module comprising the rolling-body guide part and the raceway insert can be pre-assembled, the said module being held together by way of the proposed prestress even when it is mounted on the main body. The spacing of the deflection sections on the non-deformed, non-mounted rolling-body guide part is preferably smaller than the length of the raceway inserts.

It is preferred that the main body is received with prestress between the deflection sections of the rolling-body guide part. The guide sections are preferably set under tensile stress primarily by way of the raceway insert. The prestress by way of the main body serves to simplify mounting, in order that the rolling-body guide part is held in a frictionally locking manner on the main body during mounting. As a consequence, the plate-like sections addressed below gape away from the main body. However, they are pressed against the main bodies substantially without a gap during screwing on of the end cap.

It is preferred that each radially inner deflection surface is assigned a circular aperture in the deflection section which is a constituent part of the circulatory channel. An annular aligning projection is preferably provided on the rolling-body guide part around the circular aperture, which annular aligning projection engages into an adapted aligning recess on the return channel.

It is preferred that the deflection section is configured in the region of the circular aperture in the form of a flat plate with a constant thickness.

It is preferred that the thickness of the flat plate is greater than the projecting length of the first longitudinal end face beyond the second longitudinal end face. This achieves a situation where the deflection sections have a sufficiently great rigidity, in order that they are not deformed excessively under the action of the prestress by way of the raceway insert and the main body.

It goes without saying that the features which are mentioned above and are still to be explained in the following text can be used not only in the respectively specified combination, but rather also in other combinations or on their own, without departing from the scope of the present disclosure.

BRIEF DESCRIPTION OF THE DRAWINGS

The disclosure will be explained in greater detail in the following text using the appended drawings, in which.

DETAILED DESCRIPTION

Figure 1:
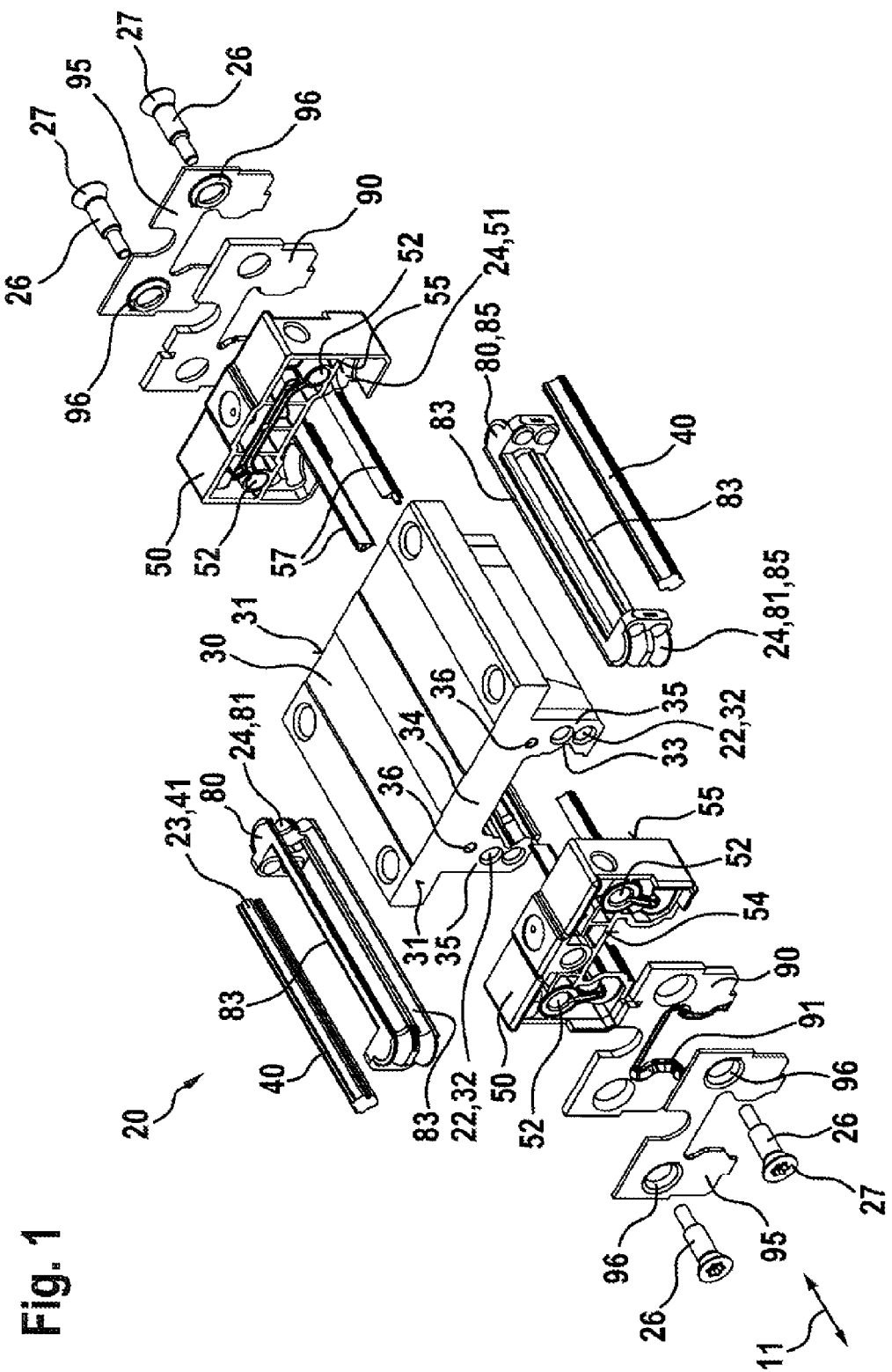
FIG. 1 shows an exploded view of a guide carriage according to the disclosure.

FIG. 1 shows an exploded view of a guide carriage 20 according to the disclosure. The guide carriage 20 comprises a main body 30 which is made from non-hardened steel and extends in a longitudinal direction 11 with a substantially constant, U-shaped cross-sectional shape. In each case one V-shaped groove 33 is arranged on the inner side of the U-limb 35, against which V-shaped groove 33 in each case one separate raceway insert 40 bears which is composed of hardened anti-friction bearing steel. The two raceway inserts 40 extend with a substantially constant cross-sectional shape in the longitudinal direction 11, the said two raceway inserts 40 having in each case two carriage raceways 41a; 41b, with the result that the guide carriage 20 has a total of four rows of rolling bodies (number 21 in FIG. 2).

In each case one end cap 50 bears with an inner longitudinal end side 55 directly against the two flat longitudinal end faces 31 of the main body 30 which lie opposite. The two end caps 50 are of identical configuration, the said two end caps 50 being produced from plastic in the injection molding process. In each case one radially outer deflection surface 51 of a curved deflection channel 24 is provided for each of the four rolling-body rows in the two end caps 50. In each case two associated ends of the two rolling-body guide parts 80, on which the radially inner deflection surfaces 81 of the curved deflection channel 24 are provided, are inserted into the end cap 50.

A return channel 32 runs in the end caps 50 which lie opposite one another between the curved deflection channels 24, which return channel 32 in the present case is configured directly in the main body 30 in the form of a circular hole which is provided with a conical counterbore at its two ends. However, the present disclosure can also be used for guide carriages, in which the return channel is configured in a separate return tube or on the outside of the main body.

In each case two circular fastening holes 52 which extend in the longitudinal direction 11 are arranged in the end caps 50. The fastening holes 52 are penetrated in each case by an associated fastening screw 26 which has an external thread on the end side which is screwed into an associated internal thread 36 in the main body 30. The internal thread 36 is arranged approximately in the region of the transition between the base 34 and an associated U-limb 35 of the main body 30, in order that the two fastening screws 26 press the associated end cap 50 uniformly onto the longitudinal end face of the main body 30 over the entire inner longitudinal end face 55.

In each case one U-shaped end seal 90 rests on the outer longitudinal end face 54 of the end cap 50, which U-shaped end seal 90 is configured substantially as a flat plate with a constant thickness, the said plate being composed of an elastomer, in particular thermoplastic ether ester elastomer (TEEE, commercial name "Hytrel"). The end seal 90 is provided with an end sealing lip 91 which bears sealingly against the guide rail (number 10 in FIG. 3).

In each case one U-shaped wiping plate 95 rests in turn on the outside of the end seal 90, which U-shaped wiping plate 95 is configured in the form of a flat plate with a constant thickness, the said flat plate being composed of stainless steel. The wiping plate 95 is configured at a slight spacing equidistantly with respect to the guide rail, with the result that it can wipe foreign bodies, for example metal chips, from the said guide rail. The fastening screws 26 penetrate both the wiping plate 95 and the end seal 90. Here, a conical head 27 of the fastening screw 26 bears against the wiping plate 95 at a deep-drawn conical counterbore 96. Here, the counterbore 96 is adapted to the head 27 so precisely that there is fluid-tight contact over the entire circumference, in order that no lubricant escapes there. The head 27 of the fastening screw 26 is provided with a Torx profile for engagement of a screwing tool. An internal thread is arranged in the fastening screw 26 at the base of the Torx profile, in order, for example, to fasten a measuring head in accordance with DE 10 2006 027 061 B4 to the guide carriage 20.

Furthermore, reference is also to be made to the rolling-body holding webs 57 which are configured in one piece on the end caps 50, the said rolling-body holding webs 57 extending between the U-limbs 35 of the main body 30. The rolling-body holding webs 57 of the two end caps 50 together extend without a gap over the entire length of the main body 30.

Figure 2:
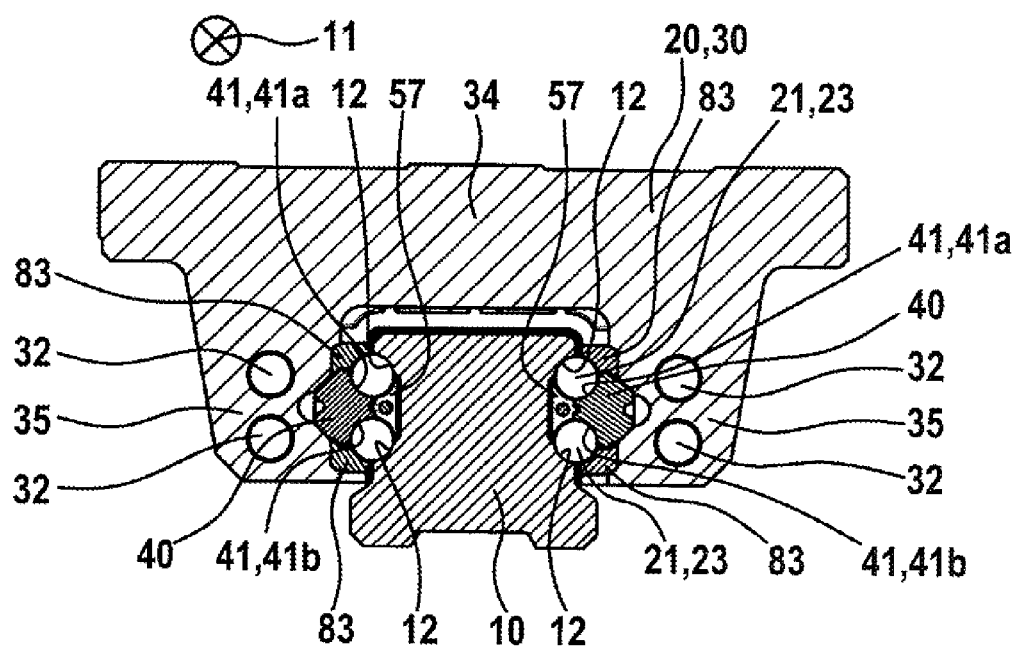
FIG. 2 shows a cross section of the guide carriage according to FIG. 1 with the associated guide rail.

FIG. 2 shows a cross section of the guide carriage 20 according to FIG. 1 with the associated guide rail 10. Here, the sectional plane runs perpendicularly with respect to the longitudinal direction 11 in the center of the main body 30.

The guide rail 10 is composed of steel and is case hardened in the region of the rail raceways 12. It extends precisely along the longitudinal direction 11 with the constant cross-sectional shape which is shown. A total of four rail raceways 12 are arranged on the guide rail 10, which rail raceways 12 delimit the load-bearing section 23 of the endless circulatory channel together with the carriage raceways 41 which lie opposite. The rail raceways and the carriage raceways 12; 41 are of circular configuration as viewed in cross section, the said raceways 12; 41 being adapted with tight osculation to the spherical rolling bodies 12. Furthermore, reference is to be made to the rolling-body holding web 57 which, together with the guide sections 83 of the rolling-body holding parts, holds the rolling bodies 21 in the guide carriage 20 when the latter is not situated on the guide rail 10.

The present guide carriage 20 has four rows of endlessly circulating rolling bodies 21 which are loaded in what is known as an O-arrangement.

Figure 3:
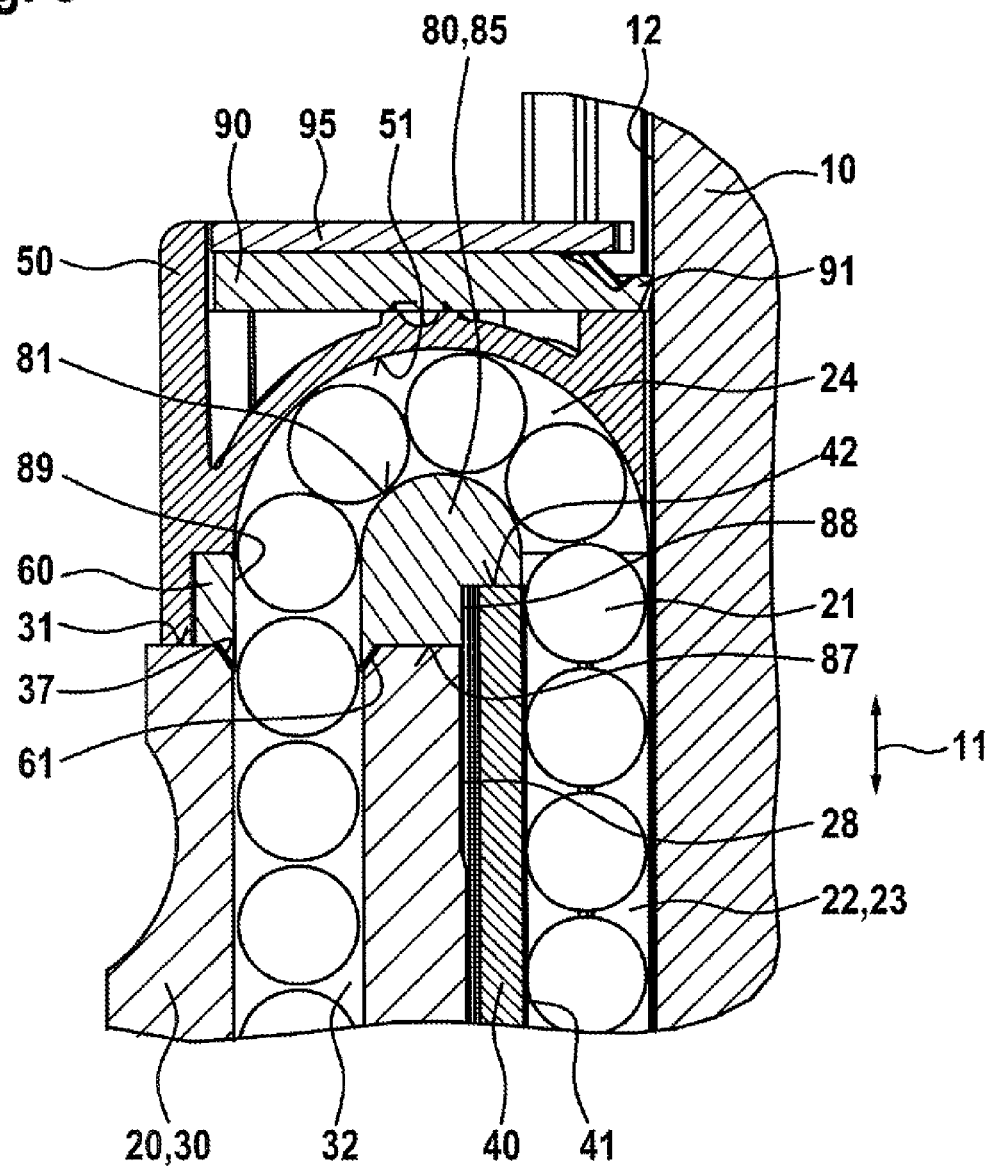
FIG. 3 shows a partial sectional view of the guide carriage according to FIG. 1, the sectional plane running through the rolling-body center points of a row of rolling bodies.

FIG. 3 shows a partial sectional view of the guide carriage 20 according to FIG. 1, the sectional plane running through the rolling-body center points of a row of rolling bodies 21. The following comments apply to all four rolling-body circulatory means at both ends of the rolling-body circulatory means.

The raceway insert 40 bears directly against the main body 30, the said raceway insert 40 resting loosely on the said main body 30. An integrally joined connection is not provided, that is to say the raceway insert 40 is pressed against the main body 30 solely by way of the prestressing force of the rolling bodies 21. The main body 30 has a flat second longitudinal end face 31 which extends perpendicularly with respect to the longitudinal direction 11. The raceway insert 40 has a flat first longitudinal end face 42 which extends perpendicularly with respect to the longitudinal direction 11. The raceway insert 40 protrudes with the first longitudinal end face 42 in the longitudinal direction 11 beyond the second longitudinal end face 31 of the main body 30. A gap 28 is provided between the main body 30 and the raceway insert 40 in the region of the second longitudinal end face 31, with the result that the raceway insert 40 is not supported there by the main body 30. Rather, it bends under the prestressing force of the rolling bodies 21, with the result that the latter run gently into the load-bearing region.

Furthermore, one end of the rolling-body guide part 80 can be seen in FIG. 3; only the deflection section 85 can be seen on account of the sectional course. The radially inner deflection surfaces 81 which, together with the radially outer deflection surfaces 51 on the end cap, delimit the curved deflection channel 24 are provided on the deflection section 85.

Furthermore, a lower section 60 which is configured in the form of a flat plate with a constant thickness is provided on the deflection section 85. The thickness of the flat plate 60 is greater than the projecting length of the raceway insert 40 beyond the main body 30. A circular aperture 89 which is a constituent part of the circulatory channel 22 is provided in the flat plate 60. The circular aperture 89 is configured so as to be flush with the return channel 32 which is provided directly in the main body 30 in the form of a circular hole. An aligning recess 37 in the form of a conical counterbore is made at the end of the return channel 32. An adapted aligning projection 61 which surrounds the circular hole 89 annularly is provided in one piece on the flat plate 60 of the rolling-body part. The flat plate 60 bears with a flat bearing face 87 directly against the second longitudinal end face 31. It is to be noted here that the spacing of the two bearing faces 87 on the separate, non-deformed rolling-body guide part 80 is somewhat smaller than the length of the main body 30 which is measured between its two second longitudinal end faces 31. The main body 30 is therefore received under prestress between the deflection sections 85, as a result of which, above all, the guide sections (number 83 in FIG. 2) are extended, since they are considerably more elastic than the main body 30. This achieves a situation where the rolling-body guide part 80 is held in a frictionally locking manner on the main body 30 during mounting of the guide carriage 20.

Furthermore, reference is to be made to the recess 88 in the deflection section 85 of the rolling-body guide part 80, in which recess 88 that part of the raceway insert 40 which protrudes beyond the main body 30 is received. Here, the first longitudinal end face 42 of the raceway insert 40 bears under prestress against the associated flat side face of the recess 88. During mounting of the guide carriage 20, first of all the raceway inserts 40 are inserted into the associated rolling-face part 80. As a result, the guide sections (number 83 in FIG. 2) are set under tensile stress on account of the abovementioned prestress, with the result that they are tensioned tautly. This module is designed in such a way that it can be placed in its entirety onto the main body 30, which results in the above-described frictionally locking securing between the bearing faces 87 and the second longitudinal end faces 31.

Reference is also to be made to the end seal 90 which is configured in the form of a flat plate, the said end seal 90 having an end sealing lip 91 which bears slidingly against the guide rail 10. The end seal 90 rests on the outside of the end cap 50, the said end seal 90 being covered by a wiping plate 95 which is configured at a small spacing equidistantly with respect to the guide rail 10.

Figure 4:
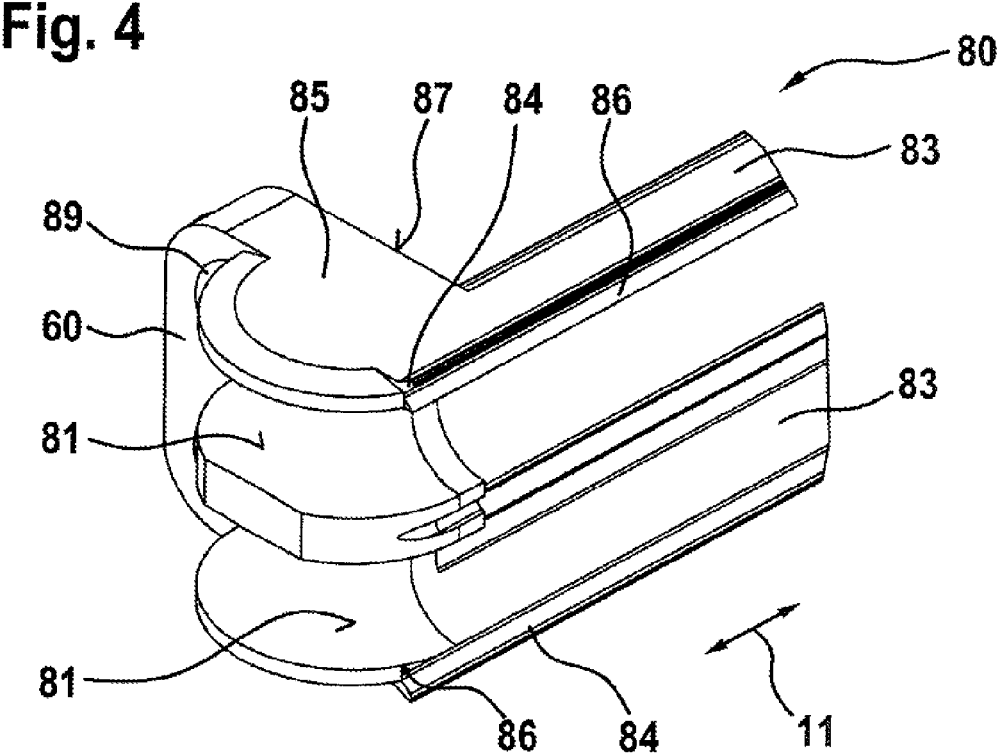
FIG. 4 shows a perspective partial view of the rolling-body guide part in the region of the radially inner deflection surfaces.

FIG. 4 shows a perspective partial view of the rolling-body guide part 80 in the region of the radially inner deflection surfaces 81. One rolling-body guide part 80 is assigned two rows of rolling bodies which run in parallel. It therefore has, at both ends, two radially inner deflection surfaces 81 of the deflection channel which run in a circularly curved manner with the same radius with regard to a common axis of curvature.

Furthermore, two parallel guide sections 83 which run with a constant cross-sectional shape in the longitudinal direction 11 are provided in one piece on the rolling-body guide part 80. In each case one longitudinal sealing lip 84 is provided on the guide sections 83, which longitudinal sealing lip 84 bears sealingly against the guide rail when the guide carriage is mounted on it. Furthermore, the guide sections 83 hold the rolling bodies in the guide carriage when the latter is not situated on the guide rail.

The rolling-body guide part 80 is of mirror-symmetrical configuration with regard to a first plane of symmetry which runs perpendicularly with respect to the axis of curvature of the curved deflection channels. Moreover, it is of mirror-symmetrical configuration with respect to a second plane of symmetry which runs perpendicularly with respect to the longitudinal direction 11. The rolling-body guide part 80 is configured in one piece, the said rolling-body guide part 80 being composed of an elastomer, preferably of thermoplastic ether ester elastomer (TEEE, commercial name "Hytrel").

In addition to the radially inner deflection surfaces 81, the deflection section 86 of the rolling-body guide part 80 has a lower section 60 which is configured in the form of a flat plate with a constant thickness. Two circular apertures 89 which penetrate the flat plate 60 in the longitudinal direction 11 are provided there. Here, each radially inner deflection surface 81 is assigned a circular aperture 89.

Figure 5:
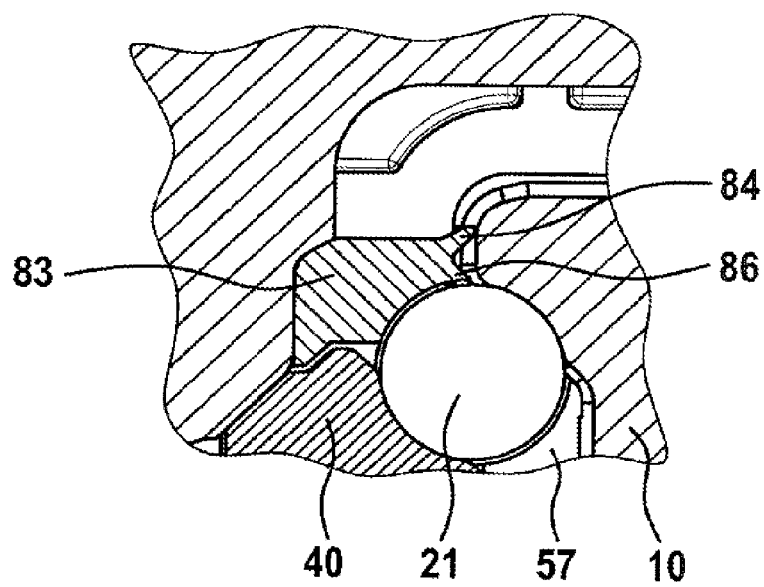
FIG. 5 shows an enlarged detail from FIG. 2 in the region of a guide section.

FIG. 5 shows an enlarged detail from FIG. 2 in the region of a guide section 83. Firstly, the holding projection 86 can be seen on the guide section 83, which holding projection 86, together with the rolling-body holding web 57 of the end caps, holds the rolling bodies 21 in the guide carriage when the latter is not situated on the guide rail. Furthermore, the longitudinal sealing lip 84 can be seen which runs spaced apart in parallel from the holding projection 86.

Figure 6:
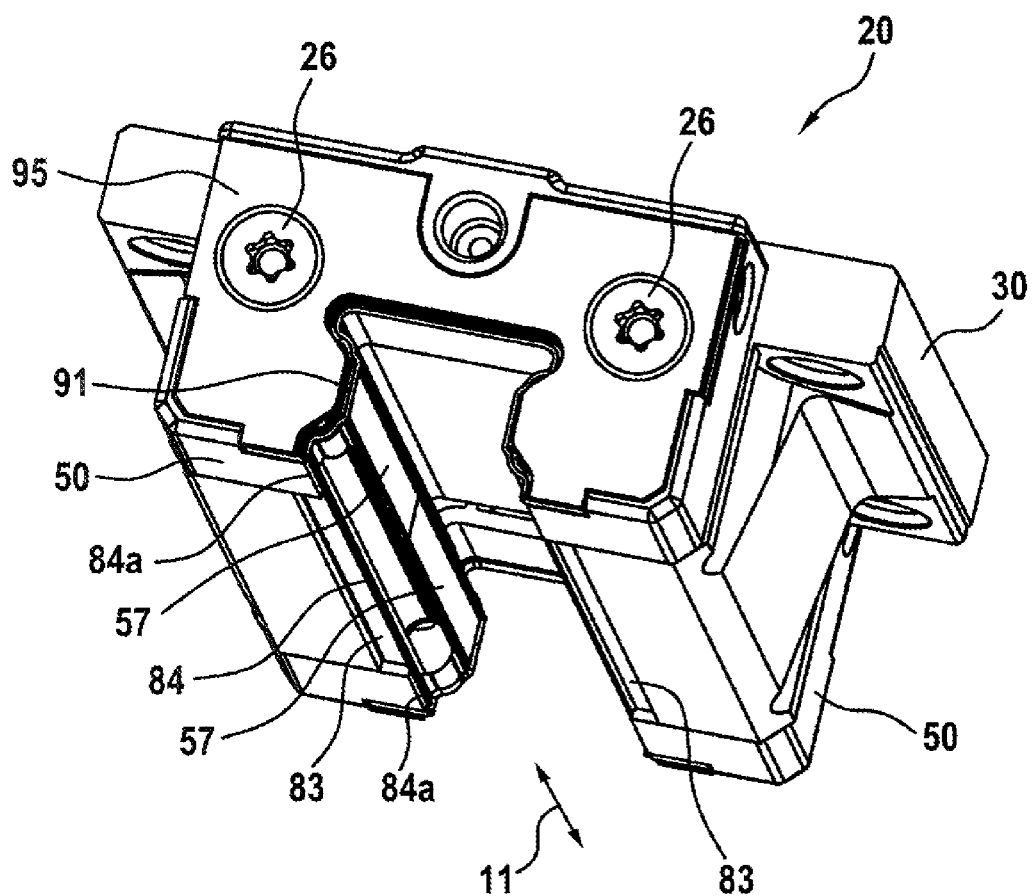
FIG. 6 shows a perspective view of the guide carriage according to FIG. 1.
Figure 7:
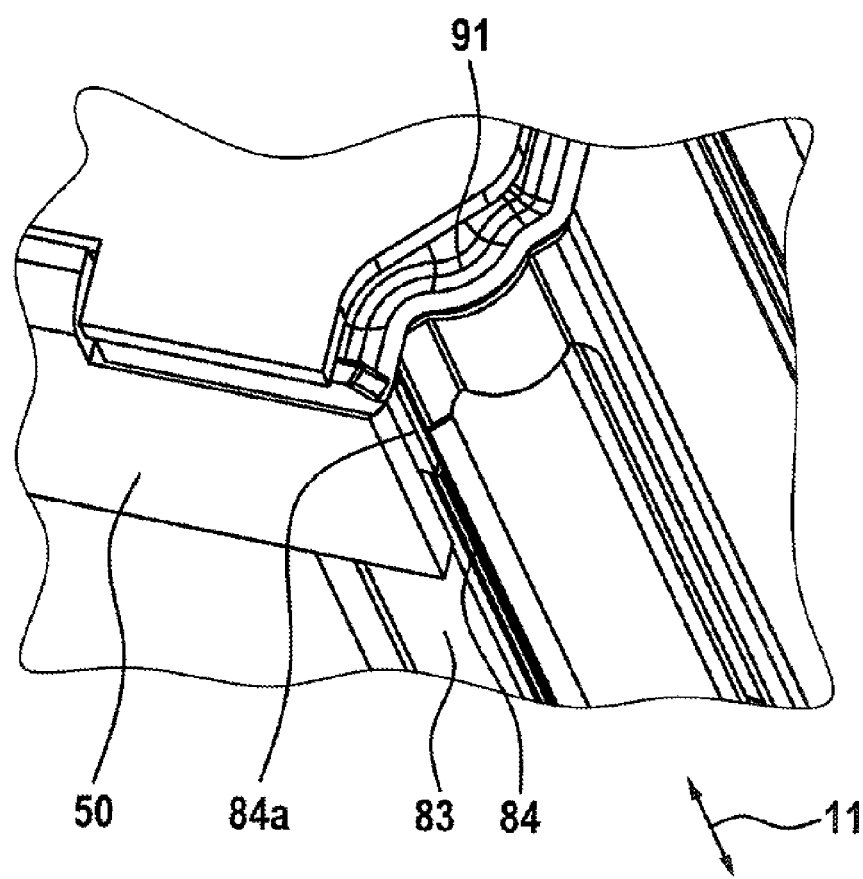
FIG. 7 shows an enlarged detail from FIG. 6 in the region of an extension of the longitudinal sealing lip.

FIG. 6 shows a perspective view of the guide carriage 20 according to FIG. 1, FIG. 7 showing an enlarged detail of FIG. 6 in the region of an extension 84a of the longitudinal sealing lip 84.

With regard to the longitudinal direction 11, the longitudinal sealing lip 84 on the guide section 83 extends somewhat into the end cap 50. Otherwise, it is continued in alignment as far as the end sealing lip 91 by way of the extension 84a which is provided in one piece on the end cap 50. Accordingly, together with the end sealing lips 91, the longitudinal sealing lips 84 enclose all the rolling-body circulatory means without interruption.

LIST OF REFERENCE NUMERALS

10 Guide rail
11 Longitudinal direction
12 Rail raceway
20 Guide carriage
21 Rolling bodies
22 Circulatory channel
23 Load-bearing section
24 Deflection channel
26 Fastening screw
27 Head of the fastening screw
28 Gap between the raceway insert and the main body
30 Main body
31 Second longitudinal end face
32 Return channel
33 V-shaped groove
34 Base
35 U-limb
36 Internal thread
37 Aligning recess
40 Raceway insert
41 Carriage raceway
41a First carriage raceway
41b Second carriage raceway
42 First longitudinal end face
50 End cap
51 Radially outer deflection surface
52 Fastening hole
54 Outer longitudinal end face of the end cap
55 Inner longitudinal end face of the end cap
57 Rolling-body holding web
60 Flat plate
61 Annular aligning projection
80 Rolling-body guide part
81 Radially inner deflection surface
83 Guide section
84 Longitudinal sealing lip
84a Extension of the longitudinal sealing lip
85 Deflection section
86 Holding projection
87 Bearing face
88 Recess
89 Circular aperture
90 End seal
91 End sealing lip
95 Wiping plate
96 Counterbore

What is claimed is:

1. A guide carriage for use with an elongate guide rail, the guide carriage comprising:
at least one row of rolling bodies received in an associated circulatory channel, the circulatory channel having a load-bearing section and a return channel, the load-bearing section and the return channel connected to one another at their ends which lie opposite one another, each of the ends of the load-bearing section and the return channel connected by a curved deflection channel, the load-bearing section delimited by a carriage raceway, which extends in a longitudinal direction on the guide carriage, and a rail raceway on the guide rail;
at least one longitudinal sealing lip extending in the longitudinal direction and arranged such that it is in sealing engagement with the guide rail when the guide carriage is mounted on the guide rail; and
at least one separate rolling-body guide part composed in one piece of an elastomer, the at least one separate rolling-body guide part including:
two deflection sections;
at least one guide section extending in the longitudinal direction and arranged between the two deflection sections;
an associated longitudinal sealing lip arranged at least in sections on the at least one guide section; and
at least one radially inner deflection surface of a deflection channel arranged on each of the two deflection sections.

2. The guide carriage according to claim 1, further comprising:
two end caps; and
at least one radially outer deflection surface of a deflection channel arranged on the two end caps, wherein each of the two deflection sections of the at least one rolling-body guide part are received in an associated end cap.

3. The guide carriage according to claim 2, wherein the longitudinal sealing lip on the at least one guide section is continued in alignment on at least one end cap of the two end caps.

4. The guide carriage according to claim 1, further comprising:
a holding projection arranged parallel to the longitudinal sealing lip on the at least one guide section, the holding projection configured to hold associated rolling bodies in the guide carriage when the guide carriage is not situated on the guide rail.

5. The guide carriage according to claim 1, wherein:
the at least one rolling-body guide part has precisely two guide sections; and
each of the two deflection sections has two radially inner deflection surfaces arranged between the two guide sections.

6. The guide carriage according to claim 1, further comprising:
a separate main body made from metal, wherein:
the carriage raceway is arranged on a separate raceway insert, the raceway insert having two first longitudinal end faces which lie opposite one another and are configured to bear against an associated deflection section of the at least one rolling-body guide part.

7. The guide carriage according to claim 6, wherein:
the main body has two second longitudinal end faces which lie opposite one another, and
the raceway insert protrudes with at least one first longitudinal end face in the longitudinal direction beyond an associated second longitudinal end face of the main body.

8. The guide carriage according to claim 7, wherein:
each of the deflection sections is configured to bear with a bearing face against an associated second longitudinal end face, and
the raceway insert is configured to engage into an adapted recess of the deflection section.

9. The guide carriage according to claim 7, wherein each radially inner deflection surface is assigned a circular aperture in the deflection section which is a constituent part of the circulatory channel.

10. The guide carriage according to claim 9, wherein the deflection section is configured in a region of the circular aperture as a flat plate with a constant thickness.

11. The guide carriage according to claim 10, wherein the thickness of the flat plate is greater than a projecting length of the first longitudinal end face beyond the second longitudinal end face.

12. The guide carriage according to claim 6, wherein the raceway insert is configured to be received with prestress between the deflection sections of the associated rolling-body guide part.

13. The guide carriage according to claim 6, wherein the main body is configured to be received with prestress between the deflection sections of the rolling-body guide part.

* * * * *